C. A. PFANSTIEHL.
COMPRESSED TUNGSTEN POWDER.
APPLICATION FILED AUG. 5, 1916. RENEWED JAN. 30, 1919.
1,315,859.
Patented Sept. 9, 1919.
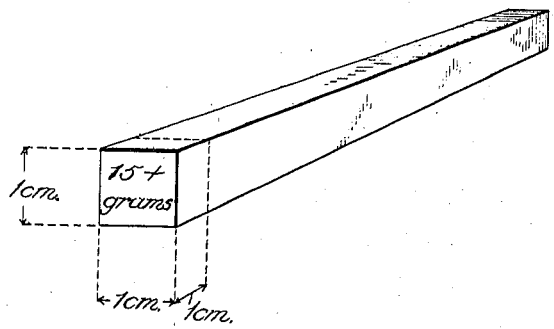

UNITED STATES PATENT OFFICE.

CARL A. PFANSTIEHL, OF HIGHLAND PARK, ILLINOIS, ASSIGNOR TO PFANSTIEHL COMPANY, INC., OF NORTH CHICAGO, ILLINOIS, A CORPORATION OF NEW YORK.

COMPRESSED TUNGSTEN POWDER.

1,315,859.   Specification of Letters Patent.   Patented Sept. 9, 1919.

Application filed August 5, 1916, Serial No. 113,323. Renewed January 30, 1919. Serial No. 274,130.

*To all whom it may concern:*

Be it known that I, CARL A. PFANSTIEHL, a citizen of the United States, residing at Highland Park, in the county of Lake and State of Illinois, have invented a certain new and useful Improvement in Compressed Tungsten Powder, of which the following is a full, clear, concise, and exact description, reference being had to the accompanying drawings, forming a part of this specification.

My invention relates to compressed tungsten powder and particularly to a substance consisting of very fine tungsten powder compressed under high pressure to form a solid capable of being machined or otherwise formed into articles of manufacture. The substance of this invention has its principal utility as a sub-product in the manufacture of rods or other articles of pure tungsten. The accompanying drawing shows a rod one centimeter square, made of compressed tungsten powder which has been compressed to such a pressure that one cubic centimeter of the rod has a weight of 15 grams or more.

In order to produce a rod of compressed tungsten having a density of 15 or more, crude tungsten trioxid $WO_3$ is suspended in hot water to which is added concentrated ammonium hydroxid. The mixture is then filtered to remove impurities and the filtrate is boiled down for concentration. As a result of this monoclinic crystals of ammonium para tungstate $(NH_4)_{10}W_{12}O_{41}5H_2O$ settle at the bottom of the evaporating vessel. These crystals are removed from the vessel, the soluble impurities being left in the solution. The crystals of ammonium para tungstate are then washed in distilled water.

The crystals of cleansed ammonium para tungstate are then treated with an excess of concentrated nitric acid to which has been added a small amount of concentrated hydrochloric acid, the solution being stirred during the mixing process. This changes the ammonium para tungstate into yellow tungsten trioxid which is insoluble in the mixture of nitric and hydrochloric acids. All traces of other metals which might be considered as impurities, however, are dissolved in the acids with which the ammonium para tungstate is treated. The yellow tungsten trioxid thus formed after being washed and dried in a gas muffle furnace or in an electric furnace to a temperature of 700 or 800 degrees centigrade is placed in nickel trays and heated for several hours to about 1000 degrees centigrade in an electric furnace through which is being passed a strong draft of pure dry hydrogen under pressure. The process above described produces substantially pure tungsten powder in a very finely divided state.

The tungsten powder thus produced is placed in a suitable mold and pressed under a pressure of substantially 135 tons per square inch. A form of die suitable for pressing the tungsten into square rods about six inches in length and being about ⅜ of an inch square is described in my co-pending application, Serial No. 124,504 filed October 9, 1916. A die and press for forming tungsten powder into other shaped articles are shown and described in my co-pending application, Serial No. 127,443 filed October 24, 1916.

Articles formed of tungsten powder made by the foregoing process have been found under the pressures given below to have densities also given below:

60 tons per square inch____ 15.17
  80 tons per square inch____ 15.85
 100 tons per square inch____ 16.40
 125 tons per square inch____ 17.09
 133⅓ tons per square inch____ 17.27
 150 tons per square inch____ 17.46

Although the articles produced under a 60-ton per square inch pressure do not have the strength that those have produced under 150 tons per square inch pressure, nevertheless they are in each instance strong enough to be carelessly handled and to be carved or otherwise formed into suitable shapes. The articles thus made may be used as chemical dishes in which to melt substances which have a high melting point but which do not alloy with tungsten below the melting point of the tungsten powder.

Such articles as chemical dishes compressed to the densities above mentioned when heated even to that temperature at which the tungsten powder sinters or welds into a solid mass do not materially change their shape or size, for example, a rod six inches long of tungsten powder which has been compressed to 133⅓ tons per square inch shrinks in length less than $\frac{1}{32}$ of an inch. There is also a slight shrinkage in other dimensions, the entire shrinkage being such as to bring the density of such a rod from 17.27 before the sintering operation to 17.70 after the sintering operation.

So far as I am aware, prior to my invention tungsten powder had not been compressed to a density as great as 12. Samples of compressed powder made by methods of the prior art have been tested, but none has exceeded a density of 11.8. Articles of tungsten powder compressed to a density of 15.15 and over when sintered produce a form of tungsten metal which is much less brittle than is the tungsten metal produced from powdered tungsten compressed to a density of 12 or less, and in order to secure malleability in the tungsten made from articles pressed to 15.15 or more a very much less amount of working of the metal is necessary than if the metal is produced from an article of tungsten powder having a density of 12 or less. I attribute this startling result to a mechanical working brought about by stress put into the particles of tungsten during the pressing operation. I have found from my experiment that coarse tungsten powder such as was used prior to my invention cannot be compressed so as to retain a density greater than 12, and that even though compressed to a pressure equal to that of the strongest tool steel press, which is about 160 tons per square inch, it is given a density of only substantially 12 and is soft and crumbly, such that it cannot readily be handled without breaking.

The word density is used herein to indicate grams per cubic centimeter. The true density of the compressed material cannot be determined by submersion in water, because of the absorbent characteristics of the material. Water must be kept out of the material during weighing by coating the same with collodion or some other waterproof material which will dry quickly without penetrating the mass.

What I claim is:

1. A solid having a density greater than 15 composed of substantially pure tungsten powder.

2. A solid composed of compressed tungsten powder in an unsintered form and having a weight of 17.25 grams per cubic centimeter.

3. An article of manufacture forming an intermediate step in the production of malleable tungsten articles, powdered tungsten compressed to a density of more than 15, having strength substantially equal to blackboard chalk.

In witness whereof I hereunto subscribe my name this 1st day of August, A. D. 1916.

CARL A. PFANSTIEHL.

Witnesses:
CLARENCE W. BACKE,
MARGARET GROBBEN.